United States Patent
Cheah

(10) Patent No.: US 11,038,426 B2
(45) Date of Patent: Jun. 15, 2021

(54) MULTI-PHASE NOISE CANCELLED ADJUSTABLE SWITCHED MODE PROGRAMMABLE LOAD

(71) Applicant: NATIONAL INSTRUMENTS CORPORATION, Austin, TX (US)

(72) Inventor: Chin-Hong Cheah, Pulau Pinang (MY)

(73) Assignee: National Instruments Corporation, Austin, TX (US)

( * ) Notice: Subject to any disclaimer, the term of this patent is extended or adjusted under 35 U.S.C. 154(b) by 78 days.

(21) Appl. No.: 16/575,758

(22) Filed: Sep. 19, 2019

(65) Prior Publication Data

US 2021/0091669 A1 Mar. 25, 2021

(51) Int. Cl.
*H02M 3/158* (2006.01)

(52) U.S. Cl.
CPC .. *H02M 3/1584* (2013.01); *H02M 2003/1586* (2013.01)

(58) Field of Classification Search
None
See application file for complete search history.

(56) References Cited

U.S. PATENT DOCUMENTS

| | | | |
|---|---|---|---|
| 4,399,372 A | 8/1983 | Tanimoto et al. | |
| 6,664,860 B2 | 12/2003 | Fallisgaard et al. | |
| 6,943,588 B1 | 9/2005 | Luo et al. | |
| 9,530,379 B2* | 12/2016 | Chiu | G09G 3/3696 |
| 2005/0088160 A1* | 4/2005 | Tanaka | H02M 3/158 323/284 |
| 2009/0189576 A1* | 7/2009 | Burstein | H02M 3/1584 323/272 |
| 2012/0051097 A1* | 3/2012 | Zhang | H02M 3/3376 363/21.07 |
| 2018/0091059 A1* | 3/2018 | Nene | H02M 3/3376 |
| 2019/0214913 A1* | 7/2019 | Murakami | H02P 29/68 |
| 2019/0245444 A1* | 8/2019 | Kimura | H02M 3/1584 |

\* cited by examiner

*Primary Examiner* — Jeffrey A Gblende
(74) *Attorney, Agent, or Firm* — Kowert, Hood, Munyon, Rankin & Goetzel P.C.; Jeffrey C. Hood; Luke Langsjoen

(57) ABSTRACT

Circuits and methods for operating a programmable load circuit that includes a plurality of sub-circuits connected in parallel between an input and an output. Each sub-circuit may include an inductor, a load, and a switch coupled to the inductor. Each switch may be configurable in a first state and a second state, wherein the inductor is either connected to the output through the load or connected to the output through a connection that bypasses the load. The switches of the plurality of first sub-circuits may be programmable to periodically switch between the first state and the second state according to a duty cycle, and the switches may be out of phase with each other by a predetermined amount. The duty cycle may be programmable to tune the load of the programmable load circuit.

20 Claims, 14 Drawing Sheets

US 11,038,426 B2

MULTI-PHASE NOISE CANCELLED ADJUSTABLE SWITCHED MODE PROGRAMMABLE LOAD

BACKGROUND

Programmable load modules are used in a wide variety of technological and electronic applications. For example, programmable load modules may be used to test performance of a device-under-test (DUT) when introduced to different load quantities. However, current designs for programmable load modules may utilize large and heavy form factors with expensive components in order to obtain the desired range of configurable load values. Accordingly, improvements in the field are desirable.

SUMMARY

Described herein are embodiments relating to a programmable load circuit, that includes a plurality of first sub-circuits connected in parallel between an input and an output of the programmable load circuit.

In some embodiments, each first sub-circuit includes an inductor, a load, and a switch coupled to the inductor. Each switch may be configurable in a first state and a second state, wherein while the switch is in the first state the inductor is connected to the output through the load, and wherein while the switch is in the second state a connection is established between the inductor and the output that bypasses the load.

In some embodiments, the switches of the plurality of first sub-circuits are programmable to periodically switch between the first state and the second state according to a first duty cycle, and the switches are out of phase with each other by a predetermined amount, The predetermined amount may be operable to reduce a variance over time in a summation of currents passing through the plurality of first sub-circuits.

In some embodiments, the load is a second sub-circuit including a capacitor connected in parallel to a switchable fixed resistor, wherein the switchable fixed resistor is configured to periodically switch between an on state and an off state. The switchable fixed resistor may be configured to be in the off state while the switch is in the second state, and the switchable fixed resistor is configured to be in the on state for at least a portion of the time that the switch is in the first state. The switchable fixed resistor may operate according to a second duty cycle.

In exemplary embodiments, each of the first duty cycle and the second duty cycle may be programmable to tune the load of the programmable load circuit.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present disclosure can be obtained when the following detailed description is considered in conjunction with the following drawings, in which.

Figure 1:
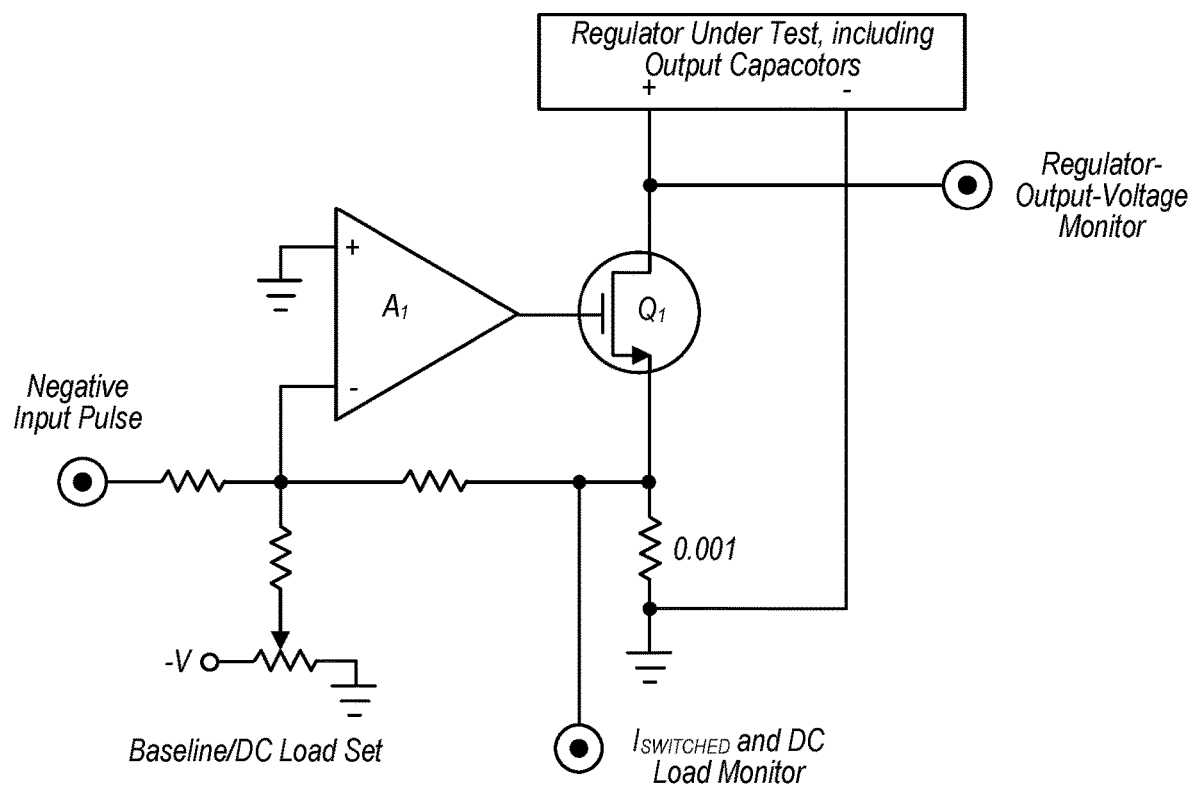
FIG. 1 is a circuit diagram illustrating a typical programmable load, according to some prior art.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents, and alternatives falling within the spirit and scope of the present disclosure as defined by the appended claims. It is noted that the word "may" is used throughout this application in a permissive sense (e.g., having the potential to, being able to), not a mandatory sense (e.g., must).

DETAILED DESCRIPTION

In the following description, numerous specific details are set forth to provide a thorough understanding of embodiments of the present disclosure. However, one having ordinary skill in the art should recognize that the disclosure may be practiced without these specific details. In some instances, well-known circuits, structures, and techniques have not been shown in detail to avoid obscuring the present disclosure.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually," wherein the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism," where the tasks are performed in an interleaved manner, e.g., by time multiplexing of execution threads.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

BACKGROUND

Programmable load modules are widely used in electronics applications, and they serve as an electronically adjustable resistance that is often constructed with active semiconductors such as metal-oxide-semiconductor field-effect transistors (MOSFETs) or bipolar junction transistors (BJTs). The MOSFETs or BJTs may serve as a dissipation element in a feedback loop that serves to maintain the resistance across that dissipation element, in order to keep the resistance, current or voltage regulated to a programmed value.

FIG. 1 illustrates an example circuit diagram of a typical programmable load, according to some current implementations. In some current implementations, programmable loads may use a MOSFET or transistor (illustrated in FIG. 1 as Q1) as a linear element. As illustrated, the comparator/feedback controller, labelled A1 in FIG. 1, may servo the gate of Q1 such that the current feedback from the 0.001Ω resistor may eventually be set to the voltage equivalent at the DC load set. The comparator/feedback controller A1 may be configured to apply continuous adjustment of its drain to source resistance, to adjust the resistance of the programmable load Q1. This has an advantage in that the possible programmed load settings are varied and continuous. However, programmable loads implemented using these topologies and techniques may be large, heavy, and expensive. There may also be an input for pulse application by allowing an additional pulse input to momentarily pulse the set point, resulting in a current step or pulse being sourced from the regulator under test (RUT) or device under test (DUT).

The linear arrangement illustrated in FIG. 1 has advantages and disadvantages. Advantageously, the illustrated programmable load circuit may operate with low noise, it may be easy to control with feedback circuits, and the circuit topology and methods are well established.

Disadvantageously, these programmable load circuits may suffer from safe operation area (SOA) issues, as large sized MOSFETs may be necessary for high voltage and/or high current scenarios. Additionally, linear MOSFETs may be expensive, and since dissipation occurs predominantly in Q1, large heatsinks may be required to prevent overheating. These aspects, combined with the large package size of Q1 may make it difficult to fit the programmable load circuit into a single slot-sized form factor, such as a PXI form factor or another form factor where high power density is desired. Furthermore, these designs may result in devices that are large in size and heavy in weight.

Because the dissipation element in the circuit illustrated in FIG. 1 is the MOSFET itself, and further due to SOA limitations, current implementations may employ a plurality of MOSFETs in parallel to meet performance standards. These MOSFETs may be mounted onto large heat sinks and systems to dissipate power.

Figure 2:
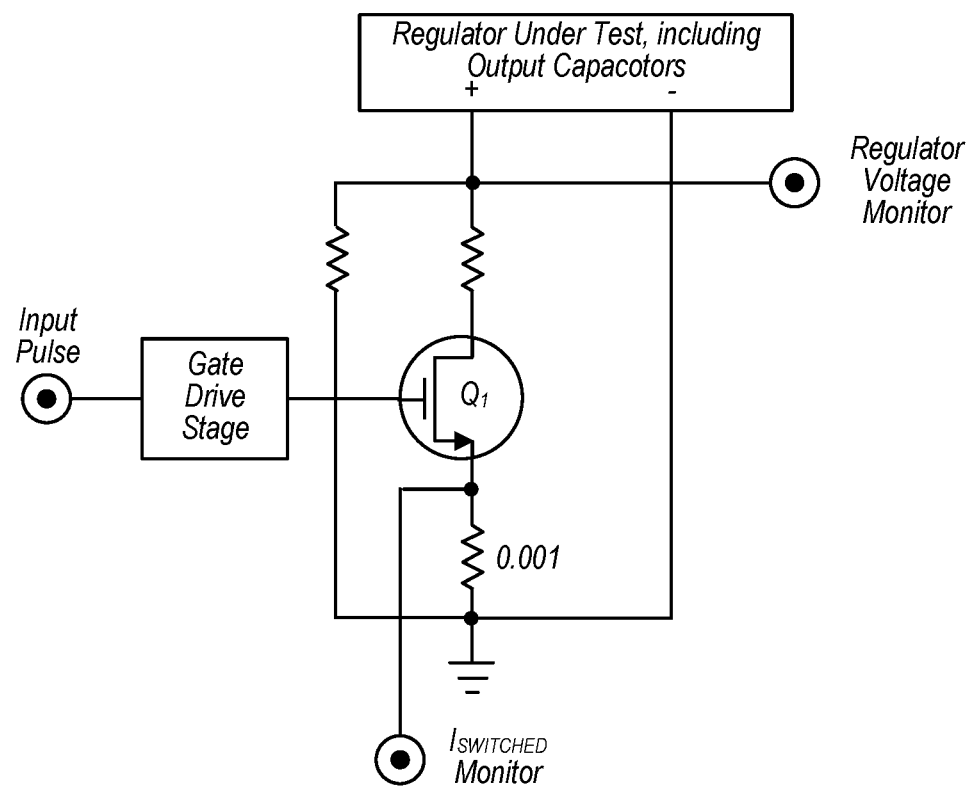
FIG. 2 is a circuit diagram illustrating a programmable load circuit employing multiple loads and switches, according to some prior art.

Another typical implementation of a programmable load circuit is illustrated in FIG. 2, which illustrates a programmable load circuit employing multiple loads and switches, according to some current implementations. As illustrated, an additional load switch and a resistor $R_{switched}$ are connected in parallel to a static DC load to the output of the regulator or DUT. In various implementations, there may be more than a single series of $R_{switched}$ and load switch (Q1) connected in parallel and they may be switched in combination to vary the load presented to the DUT by switching the $R_{switched}$ resistors into and out of the circuit. The programmed current introduced by this combination of load switches may be discrete in values, and the resolution of these values may depend on the possible combinations of active parallel resistors that are designed into the system. To accomplish a large number of combinations, there may be a large number of high current switches together with their associated resistors, leading to large size, complexity, and/or cost.

Embodiments herein present circuits and methods to address these and other concerns by utilizing a switching topology instead of a linear topology to realize a programmable electronic load. Advantageously, this may result in a small form factor and lightweight programmable electronic load module. Accordingly, the programmable electronic load may have a smaller footprint and may fit into a typical PXI-based module or another type of electronic device that employs programmable electronic loads.

Multi-Phase Noise-Cancelled Programmable Load Circuit

Embodiments herein present circuits and methods to utilize a switching topology instead of a linear topology to realize a programable electronic load, leading to a design that is very small in size and weight. Advantageously, the described embodiments produce a complete electronic load in a much smaller footprint than current implementations. Utilizing a switching topology for the programmable load circuit enables utilization of modern switching MOSFETs, which are small, inexpensive, and lightweight.

Figure 3:
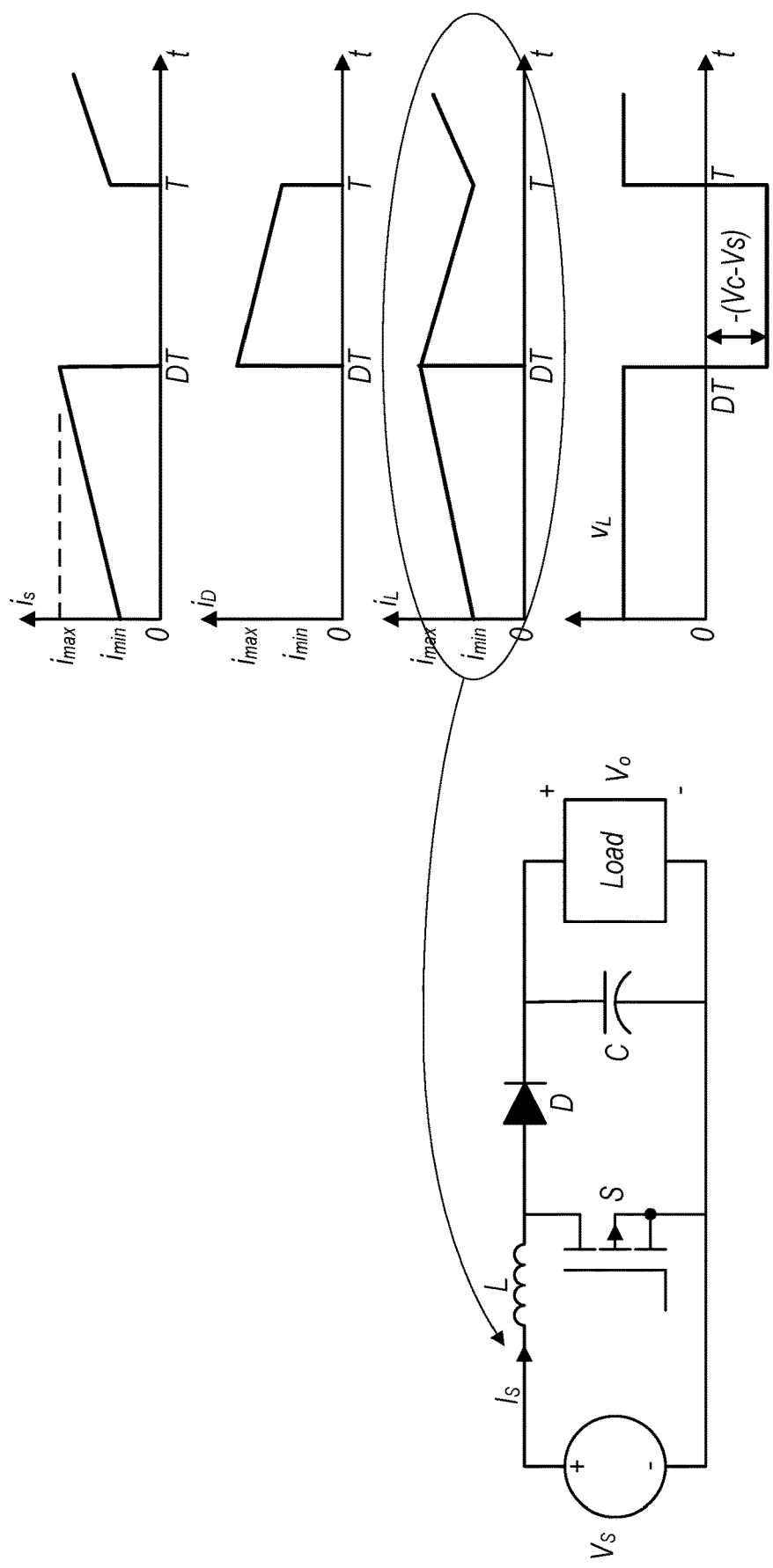
FIG. 3 includes a circuit diagram and a plot of current over time for a programmable load circuit, according to some embodiments.

Embodiments herein utilize a switch mode power supply (SMPS) arranged in a boost topology. As used herein, "boost topology" refers to a topology where the output voltage may be made equal to or higher than the input voltage, according to some embodiments. An SMPS is utilized as an input stage for a programmable electronic load, as illustrated in FIG. 3, where $V_s$ labels the DUT or system under test. By adjusting the duty cycle of the boost regulator, the magnitude of load drawn from the DUT (e.g., the current Is) may be adjusted. The boost regulator "S" illustrated in FIG. 3 represents a switch that may be switched on and off at a regular frequency and according to a specified duty cycle. This may result in a rippled current form (circled in FIG. 3), as the inductor ramps its current up and down as the switch turns on and off to connect a circuit back to the DUT or to direct the current through the load, respectively. For example, when the switch is on, the inductor, L, may be connected across the DUT, thus increasing the current through the inductor and charging up the inductor. Conversely, when the switch is turned off, the energy stored in the charged inductor may be discharged/redirected through the load via the diode D.

However, utilizing a boost regulator as illustrated in FIG. 3 may present difficulties, in that it is desirable to have a programmable load that is constant in time (i.e., without a ripple current). Furthermore, because the steady state of the circuit in FIG. 3 when the switch is off has nonzero current, the input current may not be programmable to zero. Additionally, input current noise may not be less than the inductor peak to peak ripple. To address these and other concerns, and to reduce the input current noise, embodiments herein utilize multiple phases of the same boost regulator in parallel to cancel out the ripple current.

Figure 4:
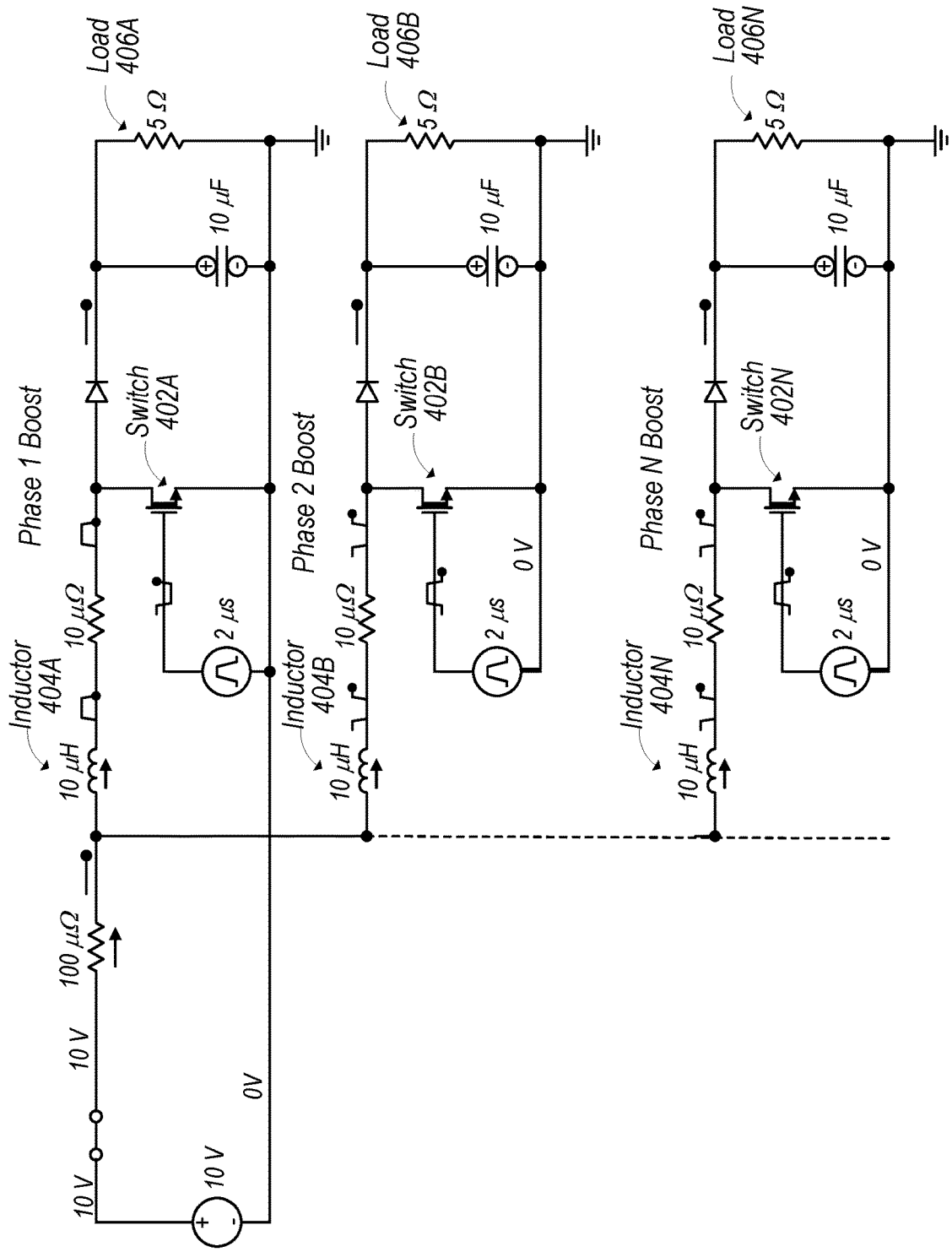
FIG. 4 is a detailed circuit diagram illustrating a parallelized phase-shifted programmable load circuit, according to some embodiments.

FIG. 4—Parallelized Phase-Shifted Programmable Load Circuit

FIG. 4 is a detailed circuit diagram illustrating a parallelized phase-shifted programmable load circuit, according to some embodiments. As illustrated, a DUT (shown as a 10V voltage source on the left side of FIG. 4) is connected to N phase boost circuits. For simplicity, the phase boost circuits will be referred to herein as "first sub-circuits" of the overall programmable load circuit. As shown, each first sub-circuit includes an inductor 404A-N coupled to a first switch 402A-N. The first switch may operate in one of two states. While in the first state, the switch is off and current through the inductor is directed through a diode. Alternatively, in the second state the switch is on and connects the inductor to ground. Each first sub-circuit further includes a capacitor connected in parallel with a resistor (i.e., the loads 406A-N), in the illustrated embodiment.

Figure 5:
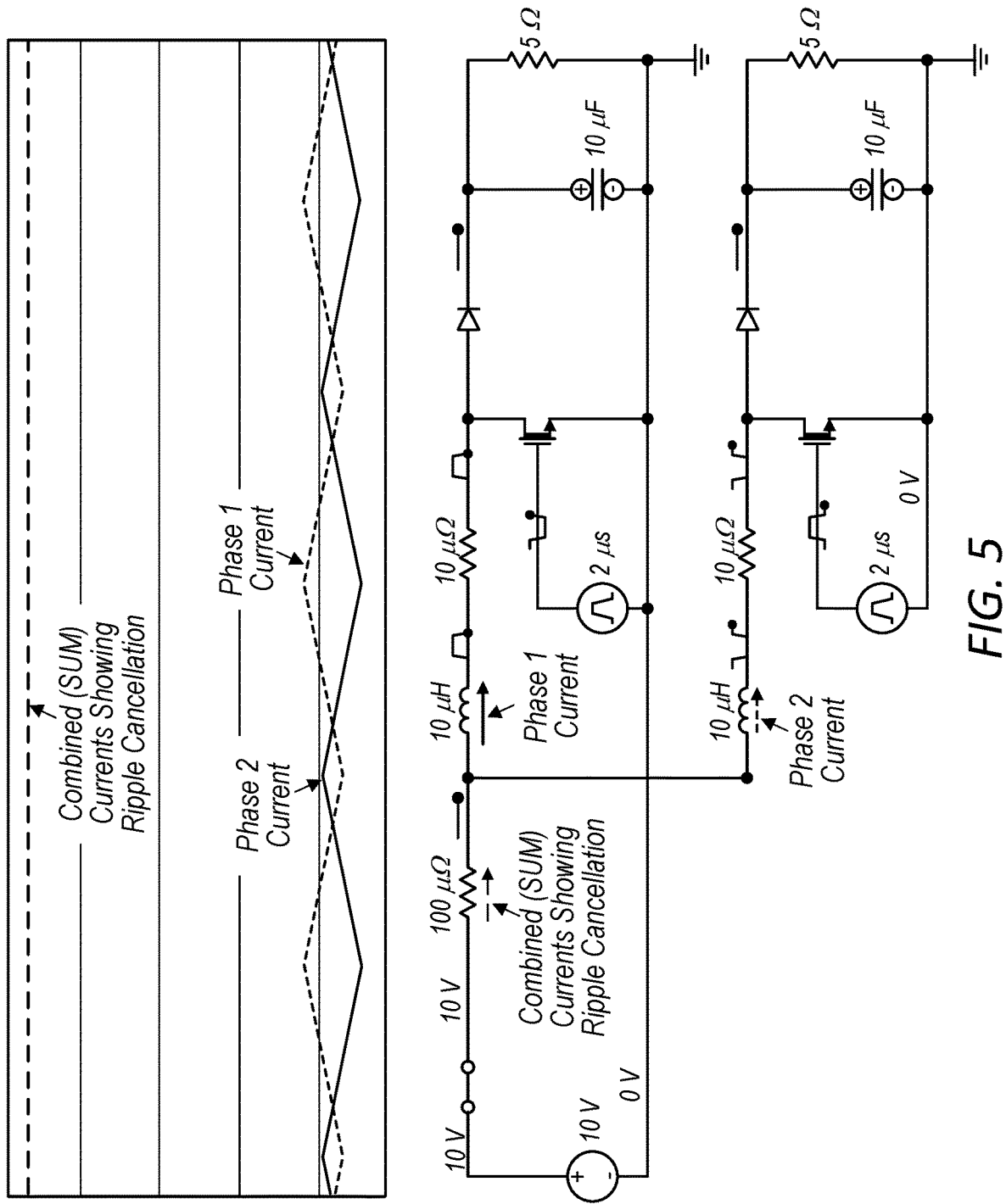
FIG. 5 resultant currents through the first and second sub-circuits for a 2-phase topology, according to some embodiments.

When two or more boost-based topology switch mode power supplies (SMPSs) (i.e., two or more first sub-circuits) are operated in parallel, the switching phase of the N-phase parallel boost power supply stage may be shifted such that they are switching at an equally divided phase relative to each other (For example, for a 2-phase topoology, phases 1 and 2 may switch with a 180 degree phase shift. For a 3-phase topology, phases 1, 2 & 3 may switch with a 120 degree phase shift and for a 4-phase topology, phase 1, 2, 3 & 4 may switch with a 90 degree phase shift relative to each other, and so on). In other words, for a 3-phase topology, the second parallel circuit may operate 120 degrees behind the first parallel circuit, and the third parallel circuit may operate 120 degrees behind the second parallel circuit (and thereby 240 degrees behind the first parallel circuit), and so on. Advantageously, these phase shifts may create cancellation of the total input ripple current. For example, FIG. 5 illustrates the resultant currents through the first and second sub-circuits for a 2-phase topology, wherein the two currents are 180° out-of-phase and the sum of the two currents is therefore constant or at least approximately constant.

Figure 6:
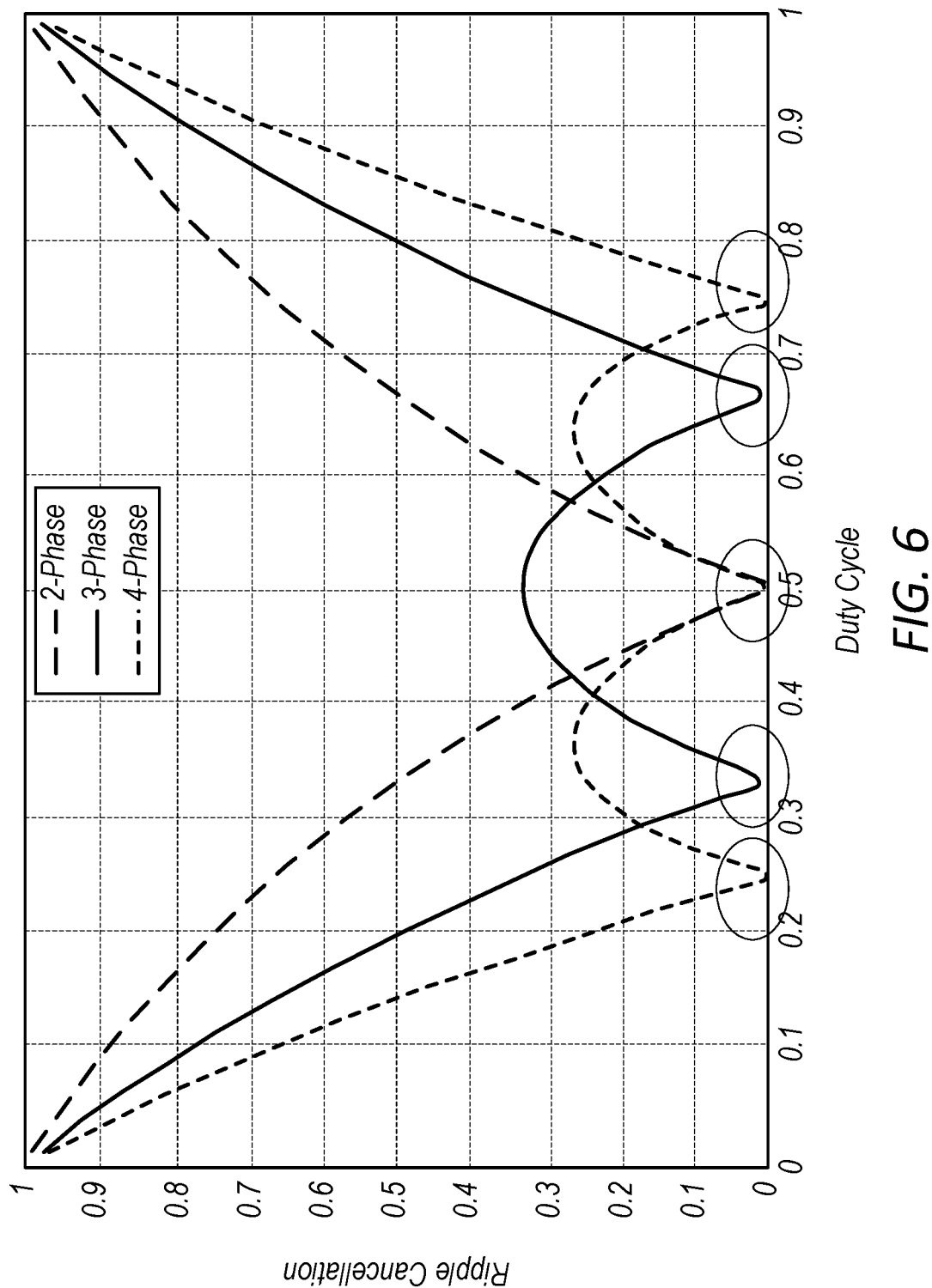
FIG. 6 illustrates the degree of current ripple cancellation as a function of duty cycle for 2, 3, and 4-phase topologies, according to some embodiments.

FIG. 6 illustrates the degree of current ripple cancellation as a function of duty cycle for 2, 3, and 4-phase topologies. Note that the duty cycle, as used herein, refers to the ratio of the time that a switch operates in the on position to the total period of oscillation between the on position and the off position. For example, a 0.25 or 25% duty cycle for a switch means that the switch spends 25% of the time in the on position and 75% of the time in the off position. As illustrated, theoretical complete ripple cancellation occurs when the duty cycle of the phase shifted, N-phase boost topology is switching at a duty cycle where N multiplied by the operating duty cycle is an integer. Note that each sub-circuit is phase-shifted but all sub-circuits operate at the same duty cycle. For example, as illustrated, for a 2 phase system, theoretical 100% cancellation occurs at a duty cycle of 0.5, or 50%. Similarly, for a 3 or 4 phase system, full cancellation occurs at additional operating duty cycle values as circled.

While the circuit illustrated in FIG. 4 achieves the desired current ripple cancellation, the realizable loads of the programmable load module are limited to a discrete set of loads resultant from a corresponding discrete set of duty cycles. Specifically, for an N-phase programmable load circuit, there are N-1 duty cycles that may result in the desired ripple cancellation. For example, in the case of a 2-phase boost implementation, in order to achieve full cancellation, the duty cycle would be fixed at 50%, resulting in a single value of the realizable load of the entire circuit. It is desirable for programmable load modules to be programmable to exhibit a continuous range of loads, and embodiments described below introduce additional circuit elements to address these and other concerns.

Continuously Adjustable Programmable Load Circuits

Figure 7:
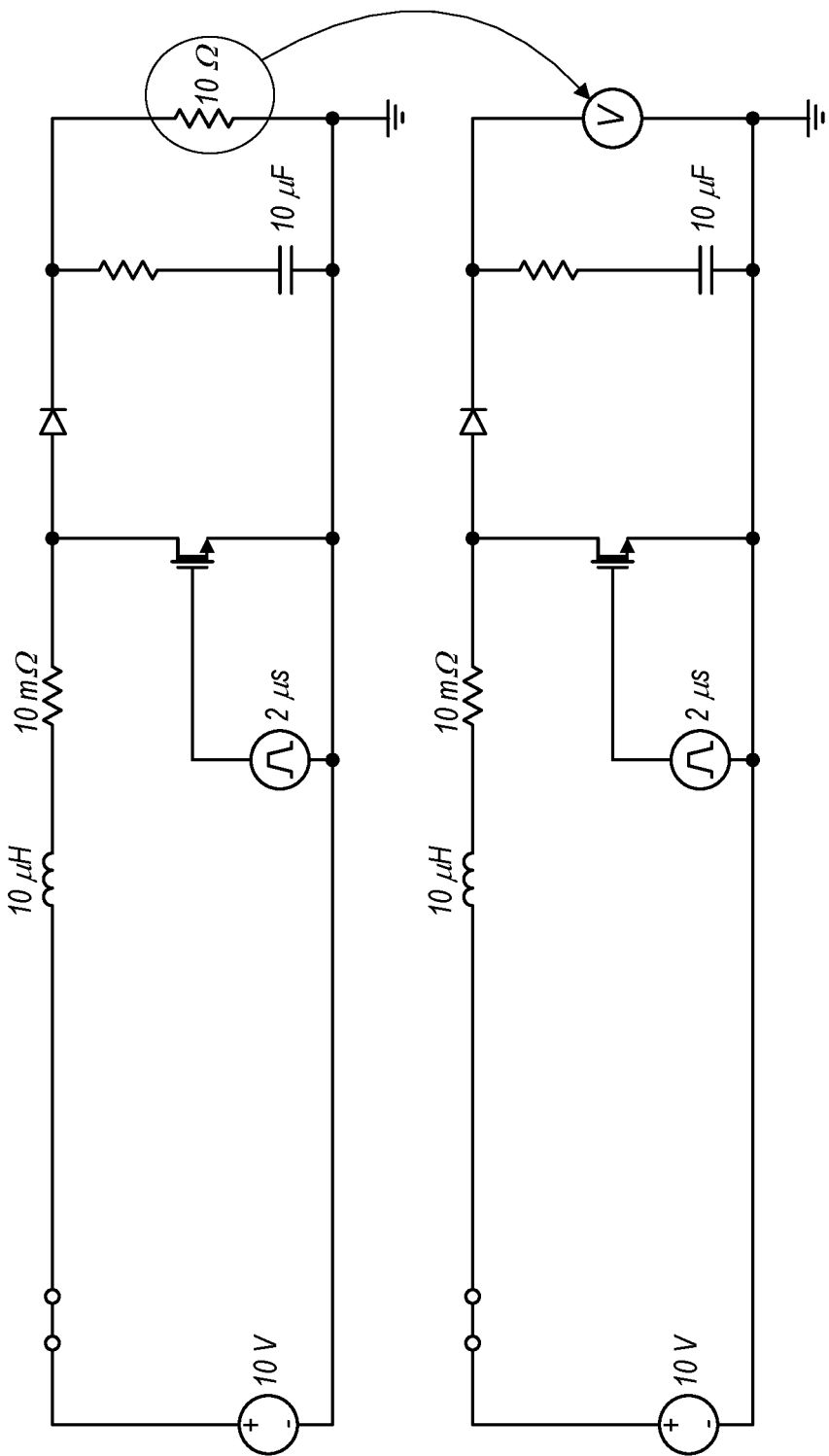
FIG. 7 illustrates a circuit diagram for a programmable load circuit that replaces the resistor with an idealized voltage source, according to some embodiments.

In some embodiments, the sub-circuit topology is modified as illustrated in FIG. 7. For simplicity, only a single phase of the N-phase topology is shown in FIG. 7, however it is understood that this may be repeated across the N phases of the overall circuit. As shown in FIG. 7, the load resistor of the boost regulator is replaced with an ideal voltage source, which we refer to as a boost output voltage load.

The ripple current equation of the boost inductor may be expressed as $\Delta I = V_{inductor}/L$. This equation indicates that while the boost MOSFET switch is "off" and the boost output diode is conducting current, the voltage across the inductor $V_{inductor}$ is approximately equal to the difference between the input voltage from the DUT (10V as illustrated in FIG. 7, although other voltages may be used) and the new boost output voltage load, $V_{out\_load}$ as illustrated in FIG. 8.

Figure 8:
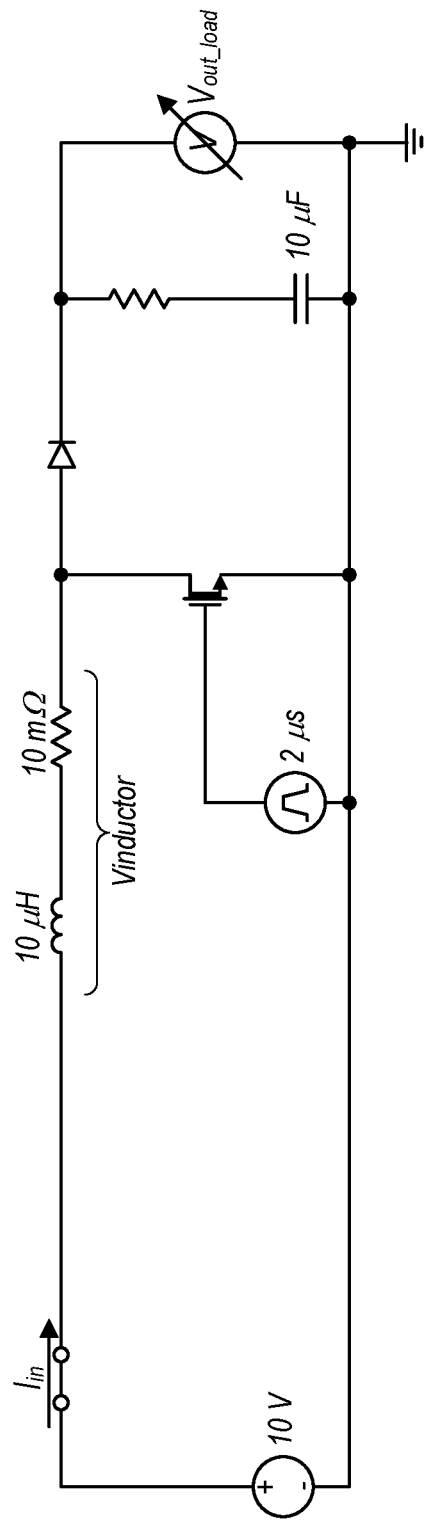
FIG. 8 is a circuit diagram illustrating how the current drawn from the DUT may be varied by varying the voltage of the voltage source, according to some embodiments.

As can be seen in FIG. 8, with a fixed pulse width modulation (PWM) duty cycle on the boost stage, the current drawn from the DUT, $I_{in}$, may be varied by varying the voltage of the voltage source, $V_{out\_load}$.

Advantageously, the circuit illustrated in FIG. 8 is configured to vary $I_{in}$ without changing the duty cycle of the boost stage, which may stay at a desirable duty cycle for input ripple current cancellation (e.g., which may depend on the desired operating point and the number, N, of phases of the boost stage that are employed and/or active in the circuit). It may be noted here that $V_{out\_load}$ here dissipates substantially all the power that the programmable load is set to.

The circuit diagrams illustrated in FIGS. 7 and 8 represent theoretical devices, and the following paragraphs and Figures illustrate practical implementations of $V_{out\_load}$ with specific circuit elements, according to various embodiments.

Figure 9:
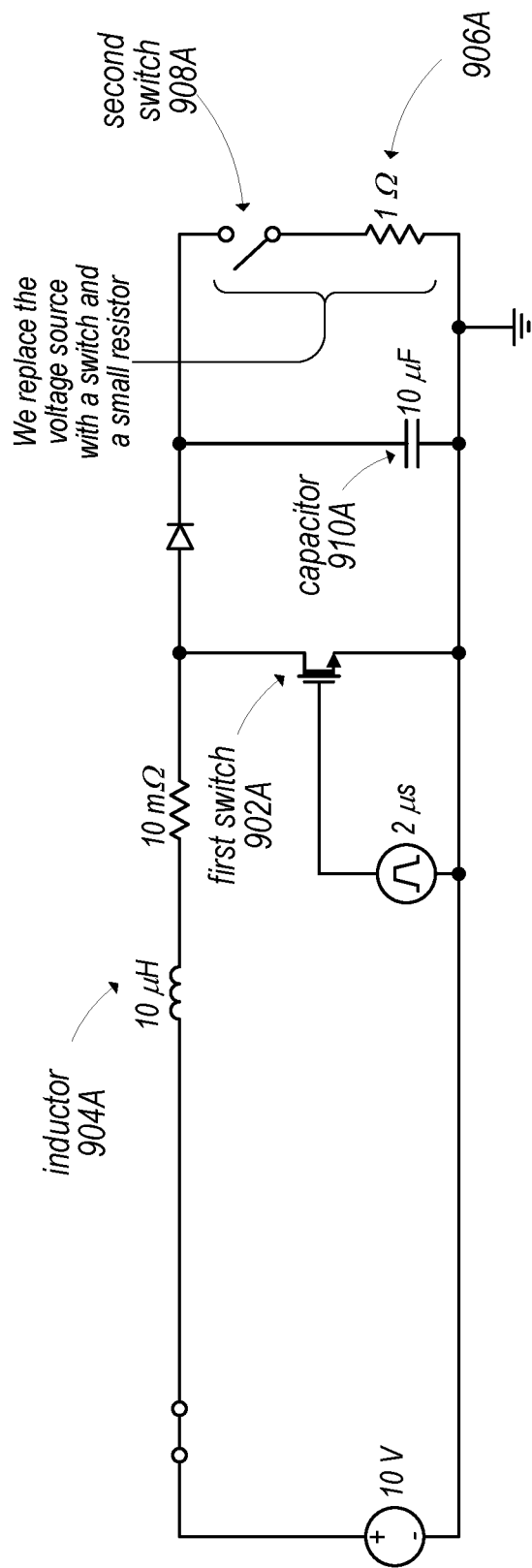
FIG. 9 is a circuit diagram of a programmable load circuit where the idealized voltage source is replaced with a resistor connected in series with a switch, according to some embodiments.

As illustrated in FIG. 9, the idealized voltage source is replaced with a switch 908A and a small resistor 906A (the resistor is 1Ω in FIG. 9, although other values are also possible). To avoid confusion, we refer to the switch 908A as a "second switch", to contrast it with the MOSFET boost switch that is configured to open a short circuit between the inductor 904A and the 10V DUT, which we shall refer to as the "first switch" 902A.

Figure 10:
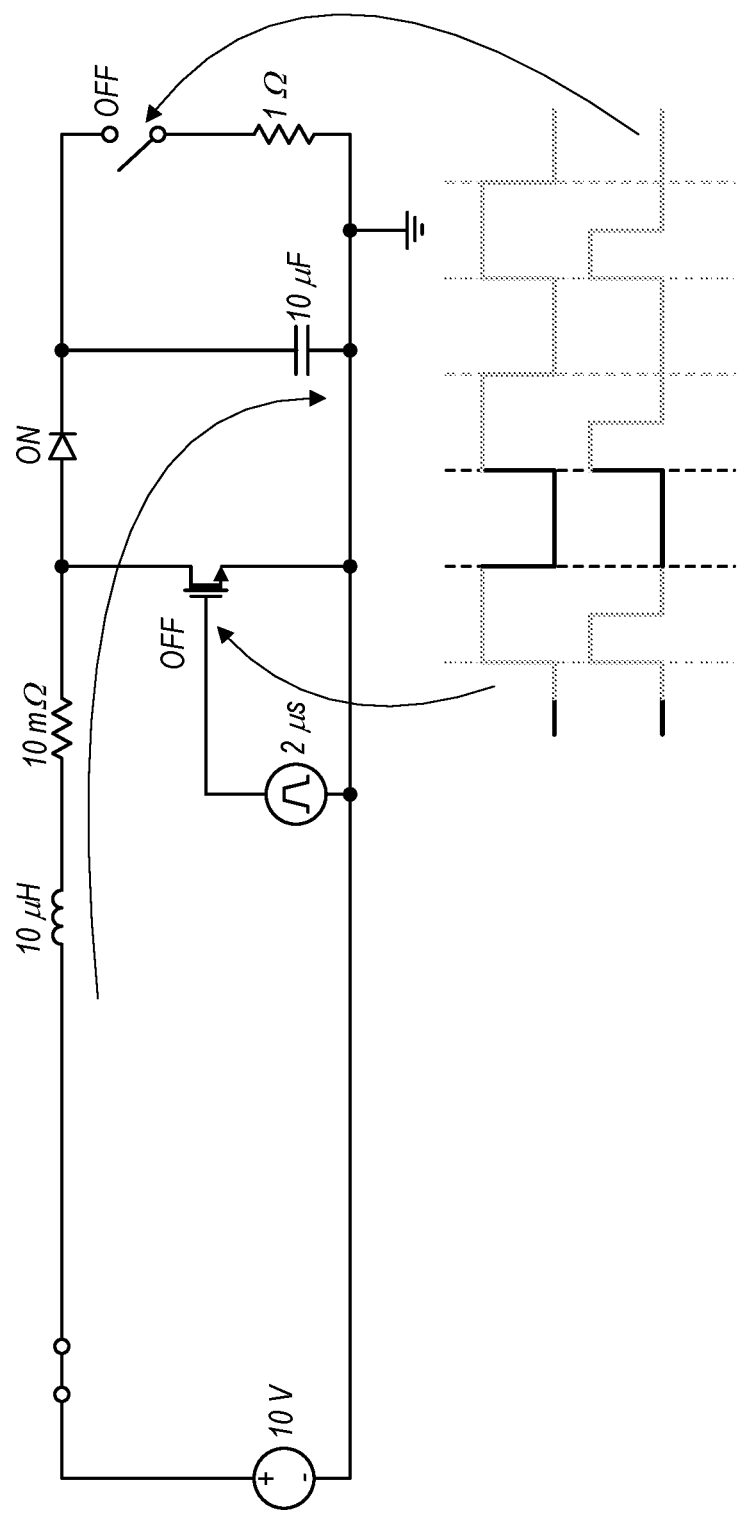
FIG. 10 illustrates a first phase of operation of a programmable load circuit when both the first switch and the second switch are off, according to some embodiments.

FIG. 10 illustrates operation of the circuit shown in FIG. 9 during a first portion of the periodic circuit operation. Specifically, FIG. 10 illustrates a first phase of operation when both the first switch and the second switch are "off" (i.e., the short circuit path from the inductor through the first switch to the DUT is closed, the current through the second switch is closed, and current is directed through the 10 µF capacitor). During this first phase of operation, the inductor current charges the output capacitor (10 uF).

Figure 11:
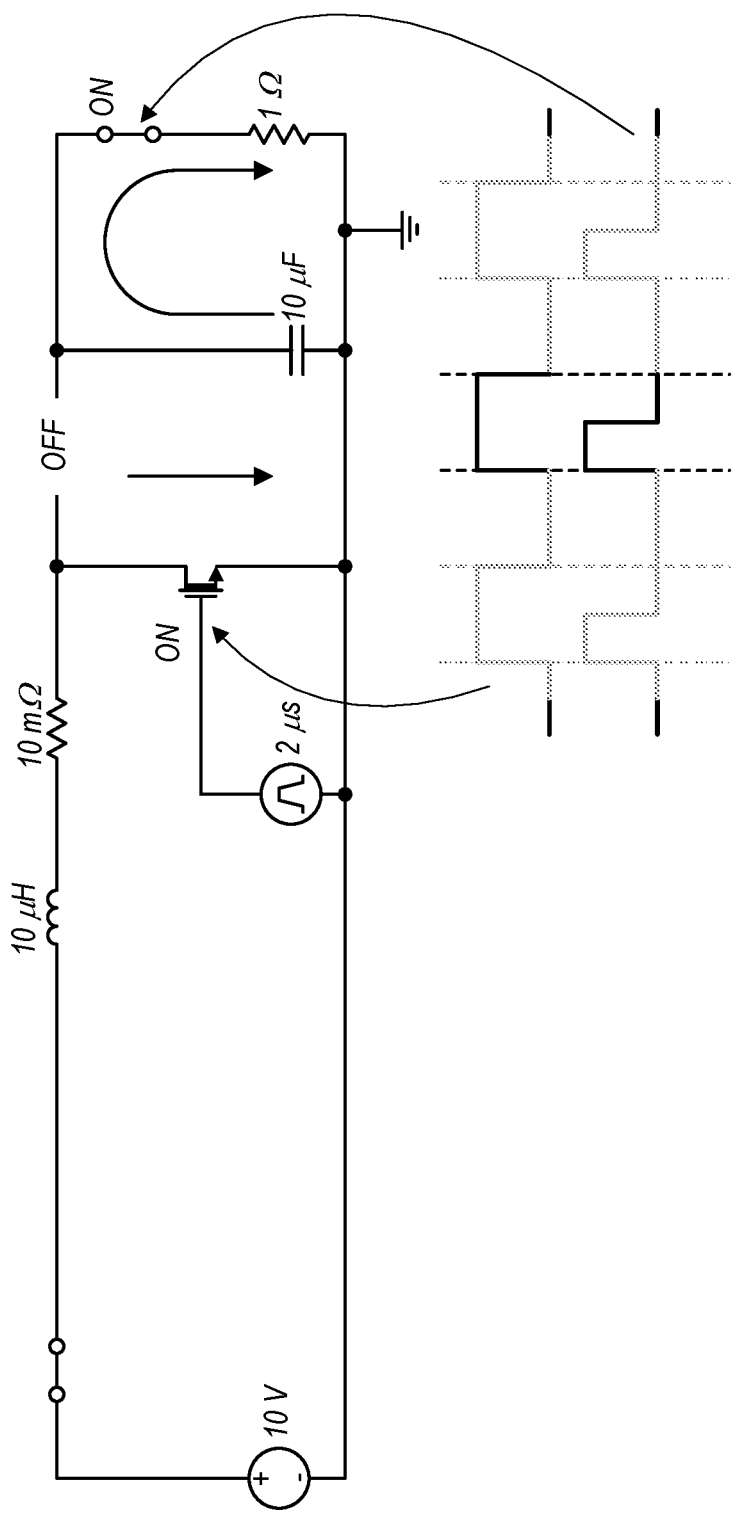
FIG. 11 illustrates a second phase of operation of a programmable load circuit where both the first switch and second switch turn on so that current may pass through both switches, according to some embodiments.

A subsequent, second phase of operation is illustrated in FIG. 11, where both the first switch and second switch turn on so that current may pass through both switches. When the first switch turns on, the boost diode effectively turns off since the boost inductor is shorted to ground. Accordingly, the current through the inductor rises. At the same time, the second switch turns on and discharges the 10 µF capacitor. The amount of discharge is proportional to the time that the second switch remains on, which is proportional to the second duty cycle of the second switch. Notice that at this point, the inductor sub-circuit is 'separated' from the capacitor sub-circuit, and hence the inductor's current ripple and the linearity of its ripple current is not affected by the behavior of the capacitor sub-circuit. This is advantageous, since non-linearity of the inductor's ripple current may degrade the effective input ripple current cancellation of the N phases.

Importantly, the first switch and the second switch may operate according to different first and second duty cycles, respectively. As illustrated in FIG. 11, the second switch may turn off before the first switch, and generally the second duty cycle may take any value ranging from zero up to the first duty cycle. Adjusting the second duty cycle may adjust the degree to which the 10 µF capacitor discharges, which correspondingly adjusts the effective voltage seen by the inductor. Advantageously, the overall load of the programmable load circuit may be continuously adjusted by continually adjusting the second duty cycle while the first duty cycle remains fixed.

Figure 12:
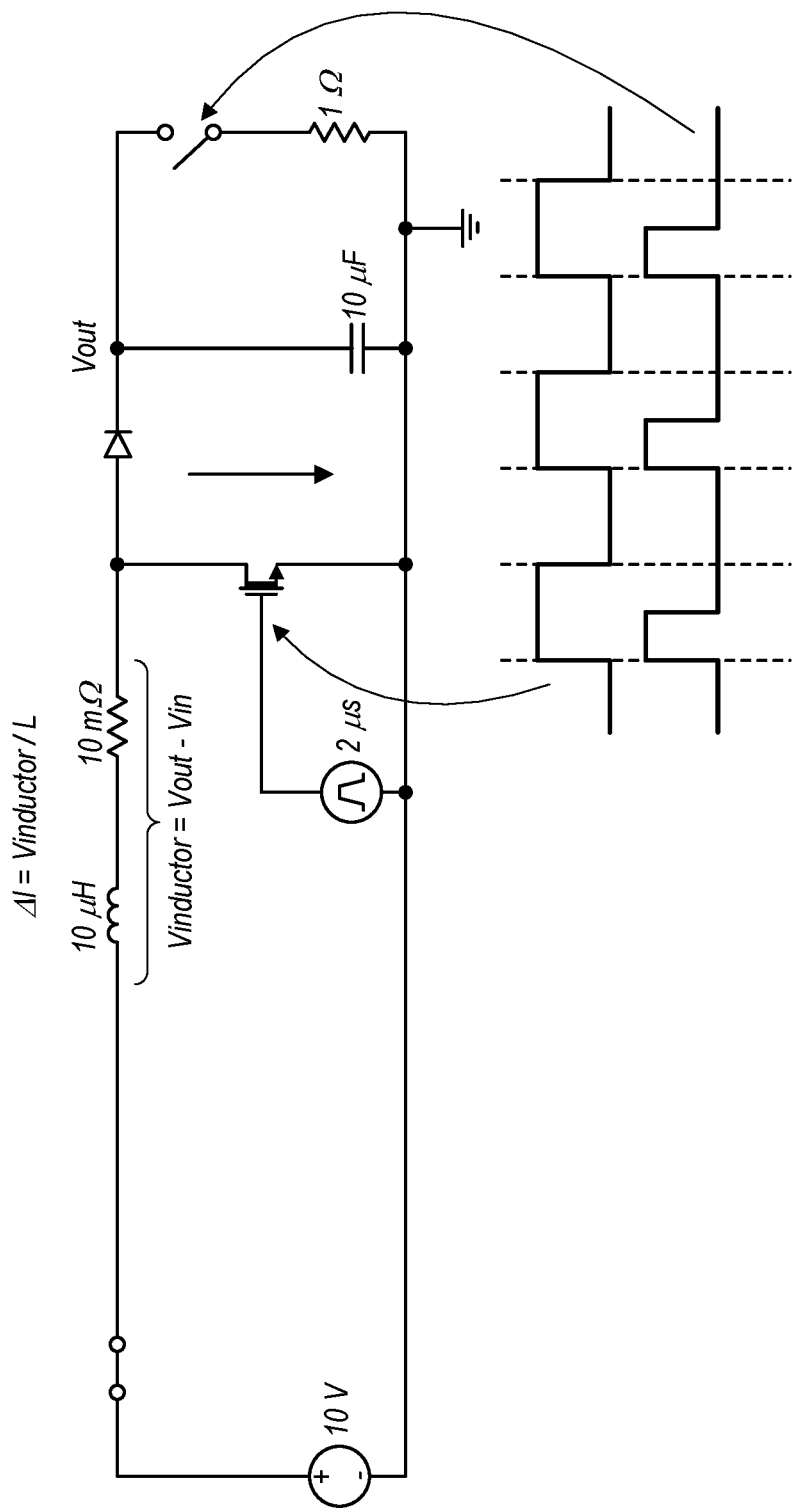
FIG. 12 illustrates repetition of the cycle of operation of a programmable load circuit over several periods, according to some embodiments.

FIG. 12 illustrates repetition of this cycle of operation over several periods. Advantageously, in steady state operation, the inductor effectively sees an approximately constant $V_{out}$ during operation of this circuit, such that the functionality of the idealized voltage source illustrated in FIGS. 7-8 is effectively realized.

Figure 13:
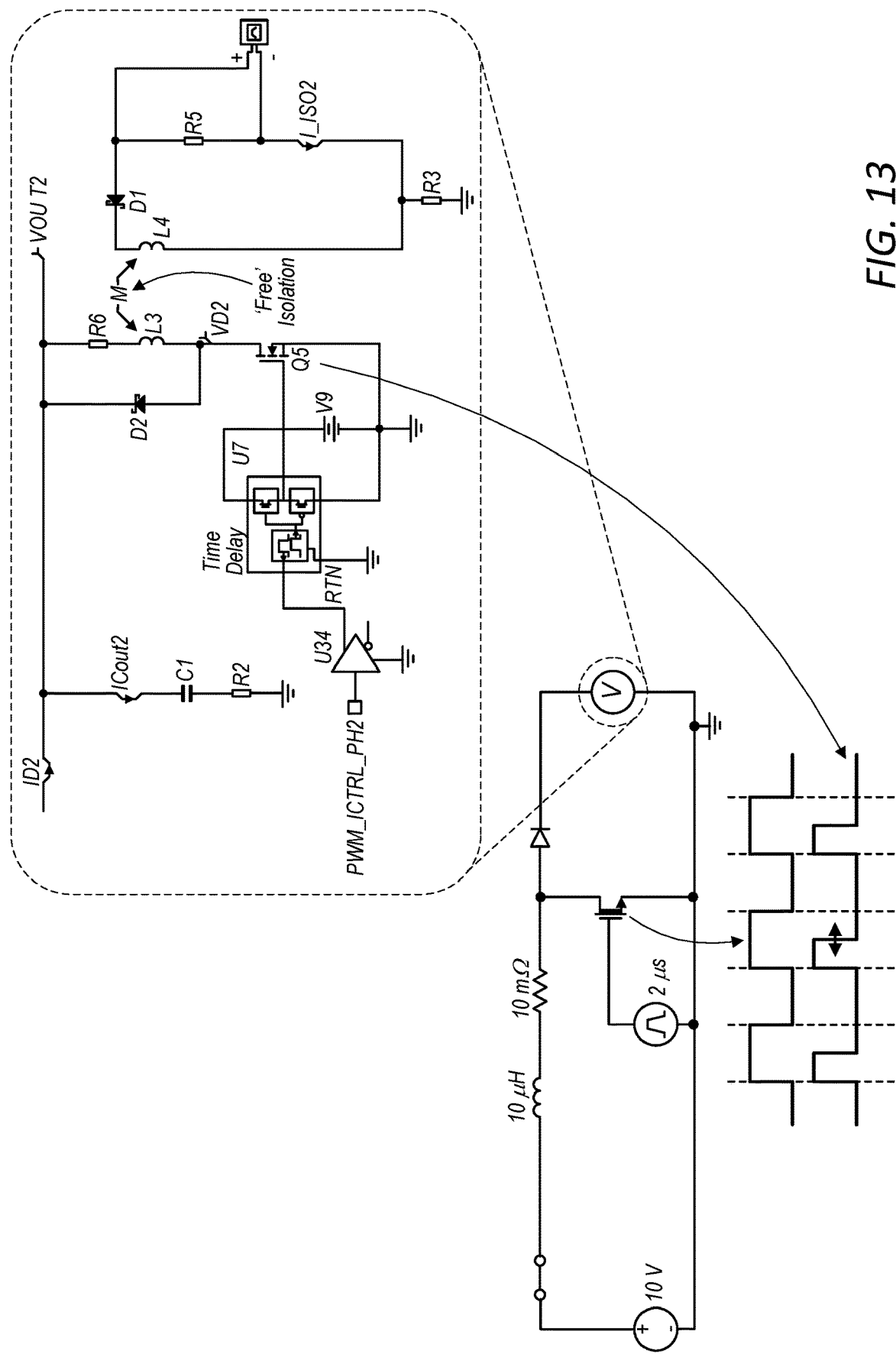
FIG. 13 is a circuit diagram illustrating a flyback topology for the load of a programmable load circuit, according to some embodiments.

FIG. 13—Flyback Topology

In some embodiments, the setup of the output switch and resistor is replaced by a flyback topology as shown in the schematic circuit diagram illustrated in FIG. 13. In the illustrated embodiment, in comparison to the circuit illustrated in FIG. 12, the 10 µF output capacitor illustrated in FIG. 12 is replaced with C1, and Q5 replaces the 2nd switch. U34, U7, V9 comprise a simplified drive circuit to turn on or off the switch Q5 according to the input to the buffer U34.

In this embodiment, the capacitor C1 is similarly discharged when Q5 is turned on, transferring its energy to L3 and charging it up. When Q5 is turned off, the energy stored in L3 previously is transferred magnetically to L4, as they are mutually coupled. This causes a current to flow from L4 to be dissipated in R5 (load resistor) which is similar in function to the 1Ω resistor illustrated in the circuit in FIG. 12. The remaining components in the circuit serve to support proper functioning of the flyback topology. Advantageously, using a flyback achieves isolation between the input stage and the output stage where the 'load' resistor is located.

Figure 14:
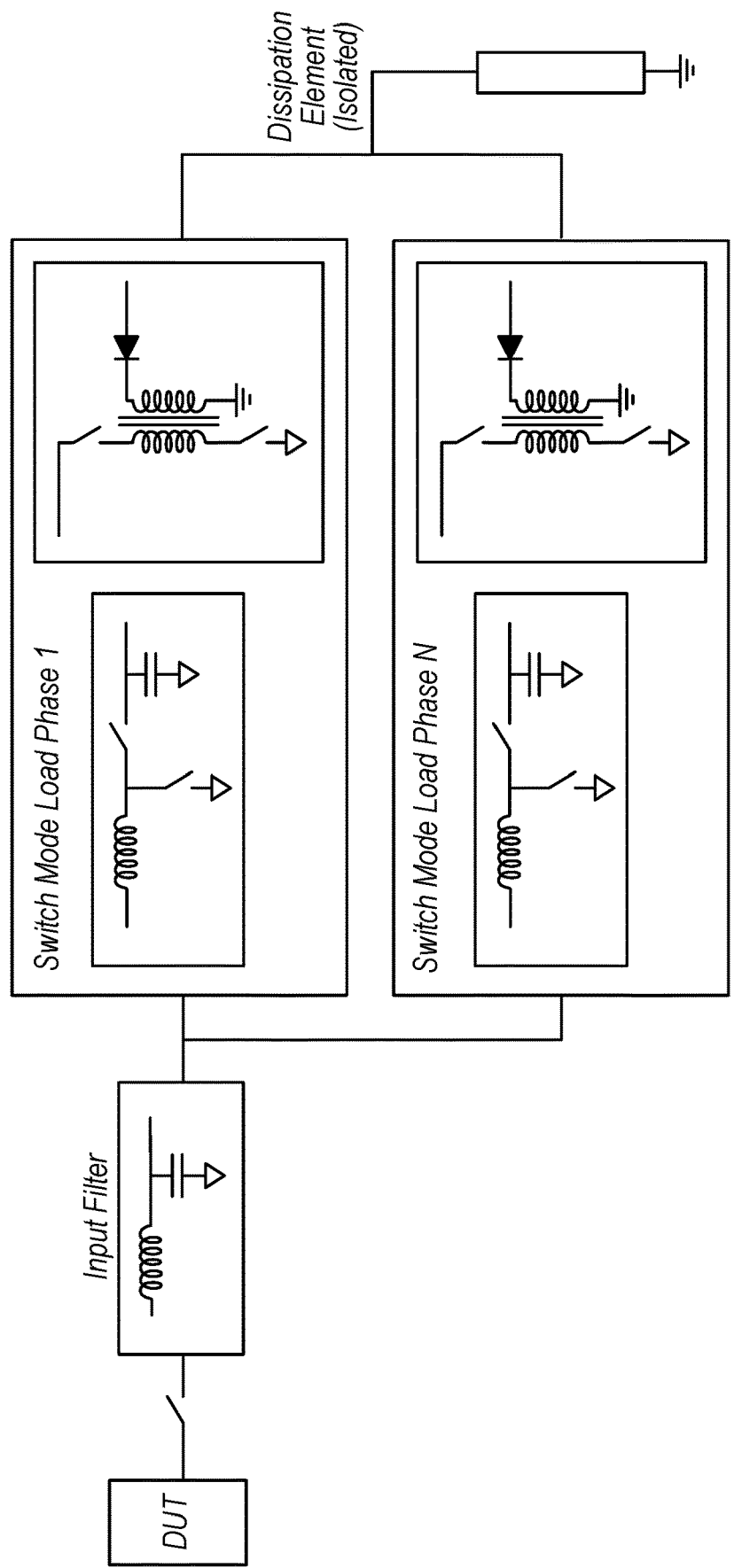
FIG. 14 illustrates a schematic multi-phase programmable load topology, according to some embodiments.

FIG. 14—Schematic Multi-Phase Programmable Load Topology

FIG. 14 illustrates a schematic multi-phase programmable load topology, according to some embodiments. Although FIG. 14 illustrates a specific example with only 2 phases of boost with their associated flyback switches, it should be understood to be within the scope of the present disclosure that this may also be implemented in any number of phases. With 2 phases, the primary boost stage would operate at 50% duty cycle, whereas with additional phases, there may be additional duty cycle operating points that result in full or almost full input ripple cancellation.

In FIG. 14, the final dissipation element is an isolated output resistor on the right side which may optionally be located remote from the main control circuitry consisting of the boost and flyback stages, as well as their associated analog and/or digital control circuitry.

Programmable Load Circuit

In some embodiments, a programmable load circuit includes a plurality of first sub-circuits connected in parallel between an input and an output of the programmable load circuit. The input may be configured to attach to a DUT or another type of device for which it is desired to introduce a programmable load. The output may connect back to the DUT or other device, or it may alternatively connect to ground.

In some embodiments, each sub-circuit may include an inductor and a switch that is configurable in a first state and a second state. While the switch is in the first state the inductor is connected to the output through a load, and while the switch is in the second state a connection is established between the inductor and the output that bypasses the load.

The switches of the plurality of first sub-circuits are configured to periodically switch between the first state and the second state, in some embodiments. The switches may be out of phase with each other by a fixed amount, and the fixed amount is selected to reduce a variance over time in a summation over currents passing through the plurality of first sub-circuits. For example, for embodiments where there are four sub-circuits, each subsequent sub-circuit may be out-of-phase with a previous sub-circuit by a fixed amount (e.g., the four sub-circuits may operate with relative phases of 0°, 90°, 180°, and 270°).

In some embodiments, the fixed amount is a fraction of the period of the switching between the first state and the second state, wherein the denominator of the fraction is equal to the number of first sub-circuits in the plurality of first sub-circuits. In other words, the fixed amount may be a fraction such as T/n, where T is the period during which the first switches complete an entire cycle, and n is the number of first sub-circuits.

A duty cycle of the periodic switching between the first state and the second state may be determined based at least in part on the number of first sub-circuits in the plurality of first sub-circuits. The duty cycle of the periodic switching between the first state and the second state may be equal to n/m, where m is the number of first sub-circuits in the plurality of first sub-circuits and n is a positive integer smaller than m.

In some embodiments, the load includes a second sub-circuit that includes a capacitor connected in parallel to a switchable fixed resistor, wherein the switchable fixed resistor is configured to periodically switch between an on state and an off state. The switchable fixed resistor may be configured to be in the off state while the switch is in the second state, and the switchable fixed resistor may be configured to be in the on state for at least a portion of the time that the switch is in the first state. The portion of the time that the switchable fixed resistor is in the on state while the switch is in the first state may be adjustable to tune an effective resistance of the load. For example, FIG. 12 illustrates one embodiment of a second sub-circuit.

In some embodiments, the load may be composed of a second sub-circuit connected to the inductor, and a load-bearing sub-circuit inductively connected to a second sub-circuit. For example, as illustrated in FIG. 13, a flyback topology may be employed wherein the load bearing portion of each first sub-circuit is isolated from the portion of the first sub-circuit that is conductively connected to the inductor.

Although the embodiments above have been described in considerable detail, numerous variations and modifications will become apparent to those skilled in the art once the above disclosure is fully appreciated. It is intended that the following claims be interpreted to embrace all such variations and modifications. Furthermore, note that the word "may" is used throughout this application in a permissive sense (e.g., having the potential to, being able to), not a mandatory sense (e.g., must). The term "include," and derivations thereof, mean "including, but not limited to." As used in this specification, the singular forms "a," "an," and "the" include plural referents unless the content clearly indicates otherwise. Thus, for example, reference to "a device" includes a combination of two or more devices.

I claim:

1. A programmable load circuit, comprising:
a plurality of first sub-circuits connected in parallel between an input and an output of the programmable load circuit, wherein each first sub-circuit comprises:
a respective inductor;
a respective switch electrically coupled to the inductor that is configurable in a first state and a second state, wherein while the switch is in the first state the inductor is connected to the output through a respective load, and wherein while the switch is in the second state a connection is established between the inductor and the output that bypasses the respective load; and
the respective load electrically coupled to the inductor, wherein the respective load comprises a respective second sub-circuit comprising:
a respective capacitor connected in parallel to a respective switchable fixed resistor, wherein the switchable fixed resistor is configured to periodically switch between an on state and an off state,
wherein the switchable fixed resistor is configured to be in the off state while the switch of the respective first subcircuit is in the second state, and
wherein the switchable fixed resistor is configured to be in the on state for at least a portion of a time that the switch of the respective first subcircuit is in the first state,
wherein the respective switches of the plurality of first sub-circuits are programmable to periodically switch between the first state and the second state, wherein the respective switches of the plurality of first sub-circuits switch out of phase with each other by a predetermined amount, and wherein the predetermined amount is operable to reduce a variance over time in a summation of currents passing through the plurality of first sub-circuits.

2. The programmable load circuit of claim 1,
wherein the predetermined amount is based at least in part on a number of first sub-circuits in the plurality of first sub-circuits.

3. The programmable load circuit of claim 1,
wherein the predetermined amount comprises a fraction of a period of the switching between the first state and the second state, wherein a denominator of the fraction is equal to a number of first sub-circuits in the plurality of first sub-circuits.

4. The programmable load circuit of claim 1,
wherein a duty cycle of the periodic switching between the first state and the second state is determined based at least in part on a number of first sub-circuits in the plurality of first sub-circuits.

5. The programmable load circuit of claim 4,
wherein the duty cycle of the periodic switching between the first state and the second state is equal to n/m, where m is the number of first sub-circuits in the plurality of first sub-circuits and n is a positive integer smaller than m.

6. The programmable load circuit of claim 1,
wherein a duty cycle of the periodic switching between the first state and the second state is selectable to tune an effective resistance of the programmable load circuit.

7. The programmable load circuit of claim 1,
wherein the portion of the time that the switchable fixed resistor is in the on state while the switch of the respective first subcircuit is in the first state is adjustable to tune an effective resistance of the respective load.

8. The programmable load circuit of claim 1,
wherein for each second sub-circuit, the respective capacitor is inductively connected in parallel to the respective switchable fixed resistor.

9. A programmable load circuit, comprising:
a plurality of first sub-circuits connected in parallel between an input and an output of the programmable load circuit, wherein each first sub-circuit comprises:
a respective inductor;
a respective first switch electrically coupled to the inductor;
a respective adjustable load circuit electrically coupled to the inductor and the respective first switch, the adjustable load circuit comprising:
a respective second switch connected in series with a respective resistor, wherein the respective second switch is configured to periodically switch between an on state and an off state;

a respective capacitor connected in parallel to the respective second switch connected in series with the resistor, wherein, for each first sub-circuit, the respective first switch is configurable in a first state and a second state, wherein while the first respective switch is in the first state the respective inductor is connected to the output through the respective adjustable load circuit, and wherein while the respective first switch is in the second state a connection is established between the inductor and the output that bypasses the adjustable load circuit, wherein the respective first switch is programmable to periodically switch between the first state and the second state according to a first duty cycle, wherein, for each first subcircuit, the respective second switch is configured to be in the off state while the respective first switch is in the second state, and wherein, for each first subcircuit, the respective second switch is configured to be in the on state for at least a portion of the time that the respective first switch is in the first state.

10. The programmable load circuit of claim 9, wherein a second duty cycle of the second switches is programmable to adjust an overall effective load of the programmable load circuit.

11. The programmable load circuit of claim 9, wherein the respective first switch of each first sub-circuit are out of phase with each other by a predetermined amount, and wherein the predetermined amount is operable to reduce a variance over time in a summation of currents passing through the plurality of first sub-circuits.

12. The programmable load circuit of claim 9, wherein the first duty cycle is programmable to tune an effective resistance of the programmable load circuit.

13. The programmable load circuit of claim 9, wherein each adjustable load circuit further comprises:
a respective second sub-circuit, wherein the capacitor of the respective adjustable load circuit is comprised within the second sub-circuit, wherein the second sub-circuit is connected to the inductor of the respective first sub-circuit; and
a respective load-bearing sub-circuit inductively connected to the respective second sub-circuit, wherein the resistor of the respective adjustable load circuit is comprised within the load-bearing sub-circuit.

14. A method for operating a programmable load circuit, the method comprising:
receiving user input to specify a load for the programmable load circuit;
determining a value for a first duty cycle and a second duty cycle based at least in part on the specified load, wherein the first duty cycle is associated with switching each of a plurality of first switches between a first state and a second state, wherein the first state couples a respective inductor to a respective load sub-circuit and the second state couples the respective inductor to ground,
wherein each load sub-circuit comprises:
a respective second switch connected in series with a respective resistor and
a respective capacitor connected in parallel with the respective second switch connected in series with the resistor, wherein the second duty cycle is associated with activation of the second switches, wherein the method further comprises:
operating the first switches and the second switches according to the first duty cycle and the second duty cycle, respectively, such that the programmable load circuit exhibits the specified load.

15. The method of claim 14,
wherein the first duty cycle and the second duty cycle are selected such that each respective second switch off when the respective first switch is off, and
wherein the first duty cycle and the second duty cycle are further selected such that each respective second switch is on for a portion of a time when the respective first switch is on.

16. The method of claim 14,
wherein the plurality of first switches are comprised within respective sub-circuits that are connected in parallel, and
wherein the respective first switches of different sub-circuits are out-of-phase with each other in activation by a predetermined amount.

17. The method of claim 16,
wherein the predetermined amount comprises a fraction of a period of the switching between the first state and the second state, wherein a denominator of the fraction is equal to a total number of the sub-circuits.

18. The method of claim 14
wherein the first duty cycle is equal to n/m, where m is a total number of first switches and n is a positive integer smaller than m.

19. The method of claim 14, wherein the load sub-circuits each comprise:
a respective first portion connected to the respective inductor; and
a respective second portion inductively connected to the first portion, wherein the second portion comprises the respective resistor.

20. The method of claim 14, the method further comprising:
adjusting the load of the programmable load circuit by adjusting the second duty cycle.

* * * * *

UNITED STATES PATENT AND TRADEMARK OFFICE
CERTIFICATE OF CORRECTION

Page 1 of 1

PATENT NO. : 11,038,426 B2
APPLICATION NO. : 16/575758
DATED : June 15, 2021
INVENTOR(S) : Chin-Hong Cheah It is certified that error appears in the above-identified patent and that said Letters Patent is hereby corrected as shown below:

In the Claims

Claim 9, Column 13, Line 8, please delete "first respective" and insert -- respective first --.

Claim 15, Column 14, Line 21, please insert -- is -- after "switch" and before "off".

Signed and Sealed this
Twentieth Day of July, 2021

Drew Hirshfeld
*Performing the Functions and Duties of the
Under Secretary of Commerce for Intellectual Property and
Director of the United States Patent and Trademark Office*